United States Patent
Yang et al.

(10) Patent No.: US 11,416,098 B2
(45) Date of Patent: Aug. 16, 2022

(54) TOUCH PANEL IN WHICH MULTIPLE ELECTRODE SHARE ONE SIGNAL LINE, DRIVING METHOD THEREOF, AND TOUCH DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Fucheng Yang, Beijing (CN); Zheng Wang, Beijing (CN); Wenchu Han, Beijing (CN)

(73) Assignees: CHENGDU BOE OPTOELECTRONICS TECHNOLOGY CO., LTD., Sichuan (CN); BOE TECHNOLOGY GROUP CO, LTD., Beijing (CN)

( * ) Notice: Subject to any disclaimer, the term of this patent is extended or adjusted under 35 U.S.C. 154(b) by 400 days.

(21) Appl. No.: 16/471,910

(22) PCT Filed: Oct. 12, 2018

(86) PCT No.: PCT/CN2018/110035
§ 371 (c)(1),
(2) Date: Jun. 20, 2019

(87) PCT Pub. No.: WO2019/184301
PCT Pub. Date: Oct. 3, 2019

(65) Prior Publication Data
US 2021/0333966 A1    Oct. 28, 2021

(30) Foreign Application Priority Data
Mar. 26, 2018 (CN) .......................... 201810253620.4

(51) Int. Cl.
*G06F 3/041* (2006.01)
*G06F 3/044* (2006.01)

(52) U.S. Cl.
CPC ........ *G06F 3/04164* (2019.05); *G06F 3/0443* (2019.05); *G06F 3/04166* (2019.05); *G06F 3/0412* (2013.01); *G06F 3/0448* (2019.05)

(58) Field of Classification Search
CPC .................. G06F 3/04164; G06F 3/04166
See application file for complete search history.

(56) References Cited

U.S. PATENT DOCUMENTS 9,703,415 B2   7/2017  Wang et al.
9,823,789 B2  11/2017  Ding et al.
(Continued)

FOREIGN PATENT DOCUMENTS

CN    102232208 A   11/2011
CN    103970392 A    8/2014
(Continued)

OTHER PUBLICATIONS

International Search Report and Written Opinion dated Jan. 17, 2019; PCT/CN2018/110035.
The First Chinese Office Action dated Nov. 28, 2019; Appln. No. 201810253620.4.

*Primary Examiner* — Chun-Nan Lin

(57) ABSTRACT

A touch panel, a driving method thereof and a touch device are provided. The touch panel includes a plurality of electrode groups and a plurality of signal lines. In a first direction, the plurality of electrode groups are sequentially arranged and include a head electrode group arranged foremost; the plurality of signal lines include at least a first signal line and a second signal line; the head electrode group includes a first head electrode, a fourth head electrode, and a second head electrode and a third head electrode which are between the first head electrode and the fourth head elec- (Continued)

trode; the first head electrode and the fourth head electrode are electrically connected with the first signal line; the second signal line is only electrically connected with the second electrode alone.

10 Claims, 14 Drawing Sheets

(56) References Cited

U.S. PATENT DOCUMENTS

| | | | |
|---|---|---|---|
| 9,933,899 B2 | 4/2018 | Yang et al. | |
| 2013/0314373 A1* | 11/2013 | Kim | G06F 3/0443 345/174 |
| 2016/0195981 A1* | 7/2016 | Shin | G06F 3/0443 345/174 |
| 2016/0266710 A1* | 9/2016 | Bytheway | G06F 3/04166 |
| 2018/0203551 A1* | 7/2018 | Huang | G06F 3/0443 |

FOREIGN PATENT DOCUMENTS

| | | |
|---|---|---|
| CN | 104020907 A | 9/2014 |
| CN | 104020912 A | 9/2014 |
| CN | 104035639 A | 9/2014 |
| CN | 104267862 A | 1/2015 |
| CN | 105094497 A | 11/2015 |
| KR | 1020140010788 A | 1/2014 |
| WO | 2013/180438 A1 | 12/2013 |

\* cited by examiner

TOUCH PANEL IN WHICH MULTIPLE ELECTRODE SHARE ONE SIGNAL LINE, DRIVING METHOD THEREOF, AND TOUCH DEVICE

This application claims the benefit of Chinese patent application No. 201810253620.4 filed on Mar. 26, 2018, which is hereby entirely incorporated by reference as a part of the present application.

TECHNICAL FIELD

Embodiments of the present disclosure relate to a touch panel, a driving method of the touch panel and a touch device.

BACKGROUND

With the continuous development of touch control technologies, the touch control technologies are increasingly used in electronic products such as mobile phones, tablets and notebook computers. Generally, touch panels are classified into types such as a capacitive type, an electromagnetic type, a resistive type, an optical type and the like. The capacitive type touch panels are classified into, for example, add-on touch panels, on-cell touch panels and in-cell touch panels.

The in-cell touch panels, for example, realize touch detection by utilizing a mutual capacitance principle or a self-capacitance principle. A single-layer multi-point in-cell touch panels, for example, utilizes the self-capacitance principle to achieve multi-touch. In the single-layer multi-point in-cell touch panel, each touch sensor unit is connected with a touch driving chip through a conducting line, and then the touch driving chip senses a capacitance variation of each touch sensor unit to determine a touch location.

SUMMARY

At least one embodiment of the present disclosure provides a touch panel which includes a plurality of electrode groups and a plurality of signal lines; in a first direction, the plurality of electrode groups are sequentially arranged and the plurality of electrode groups include a head electrode group arranged foremost; the plurality of signal lines include at least a first signal line and a second signal line; the head electrode group includes at least a first head electrode, a second head electrode, a third head electrode and a fourth head electrode, and the second head electrode and the third head electrode are between the first head electrode and the fourth head electrode; the first head electrode and the fourth head electrode are electrically connected with the first signal line, and the second signal line is only electrically connected with the second head electrode alone.

For example, in the touch panel according to one embodiment of the present disclosure, the plurality of electrode groups further include a tail electrode group arranged at a rearmost side, and the plurality of signal lines further include at least a third signal line.

The tail electrode group includes at least a first tail electrode, a second tail electrode, a third tail electrode and a fourth tail electrode, the second tail electrode and the third tail electrode are between the first tail electrode and the fourth tail electrodes, and the first tail electrode and the fourth tail electrode are electrically connected with the third signal line.

For example, in the touch panel according to one embodiment of the present disclosure, the plurality of signal lines further include a fourth signal line, and the third head electrode and the second tail electrode are electrically connected with the fourth signal line.

For example, in the touch panel according to one embodiment of the present disclosure, the plurality of signal lines further include a fifth signal line, and the fifth signal line is only electrically connected with the third tail electrode alone.

For example, in the touch panel according to one embodiment of the present disclosure, the tail electrode group further includes a fifth tail electrode, and the plurality of signal lines further include a sixth signal line; the sixth signal line is only electrically connected with the fifth tail electrode alone.

For example, in the touch panel according to one embodiment of the present disclosure, the tail electrode group further includes a fifth tail electrode and a sixth tail electrode, and the plurality of signal lines further include a fifth signal line and a sixth signal line; the sixth signal line is only electrically connected with the fifth tail electrode alone, and the third tail electrode and the sixth tail electrode are electrically connected with the fifth signal line.

For example, in the touch panel according to one embodiment of the present disclosure, the first signal line and the third signal line are on a first side of the head electrode group and the tail electrode group, and the second signal line, the fourth signal line and the fifth signal line are on a second side of the head electrode group and the tail electrode group.

For example, in the touch panel according to one embodiment of the present disclosure, the first signal line, the second signal line, the third signal line, the fourth signal line and the fifth signal line are in a same layer.

For example, in the touch panel according to one embodiment of the present disclosure, the plurality of electrode groups are in a same layer, and the first signal line, the second signal line and the third signal are in the same layer as the plurality of electrode groups.

For example, in the touch panel according to one embodiment of the present disclosure, the head electrode group further includes a fifth head electrode, the tail electrode group further includes a fifth tail electrode, and the plurality of signal lines further include a seventh signal line; the fifth head electrode and the fifth tail electrode are electrically connected with the seventh signal line.

For example, in the touch panel according to one embodiment of the present disclosure, the fifth head electrode is between the second head electrode and the third head electrode, and the fifth tail electrode is between the second tail electrode and the third tail electrode.

For example, in the touch panel according to one embodiment of the present disclosure, the seventh signal line is in a layer different from a layer where at least one of the first signal line, the second signal line and the third signal line is located.

For example, in the touch panel according to one embodiment of the present disclosure, in the first direction, the first head electrode, the second head electrode, the third head electrode and the fourth head electrode are sequentially arranged and the first tail electrode, the second tail electrode, the third tail electrode and the fourth tail electrode are sequentially arranged.

For example, in the touch panel according to one embodiment of the present disclosure, the plurality of electrode groups further include an intermediate electrode group between the head electrode group and the tail electrode group, and the plurality of signal lines further include a fourth signal line, an eighth signal line and a ninth signal line; the intermediate electrode group includes at least a first intermediate electrode, a second intermediate electrode, a third intermediate electrode and a fourth intermediate electrode; the first intermediate electrode and the fourth intermediate electrode are electrically connected with the eighth signal line, the third head electrode and the second intermediate electrode are electrically connected with the fourth signal line, and the third intermediate electrode and the second tail electrode are electrically connected with the ninth signal line.

For example, in the touch panel according to one embodiment of the present disclosure, the head electrode group further includes a fifth head electrode, the tail electrode group further includes a fifth tail electrode, the intermediate electrode group further includes a fifth intermediate electrode, and the plurality of signal lines further include a seventh signal line and a tenth signal line; the fifth head electrode is electrically connected with the seventh signal line, and the fifth tail electrode is electrically connected with the tenth signal line; and the fifth intermediate electrode is electrically connected with the seventh signal line, or the fifth intermediate electrode is electrically connected with the tenth signal line.

At least one embodiment of the present disclosure provides a touch device including the touch panel according to any one of the above embodiments.

For example, the touch panel touch device provided by one embodiment of the present disclosure further includes a touch chip. The plurality of signal lines are electrically connected with the touch chip, the touch chip is configured to apply a touch driving signal to electrodes in the plurality of electrode groups through the plurality of signal lines, and the touch chip is further configured to read touch sensing signals of the electrodes in the plurality of electrode groups of the touch panel through the plurality of signal lines, so as to determine a touch position.

At least one embodiment of the present disclosure further provides a driving method of the touch panel according to any one of the above embodiments, and the method includes: applying a touch driving signal to electrodes in the plurality of electrode groups of the touch panel through the plurality of signal lines in a time division manner; reading touch sensing signals of the electrodes in the plurality of electrode groups of the touch panel through the plurality of signal lines, and determining a touch position of a touch operation according to the touch sensing signal.

For example, in the driving method provided by one embodiment of the present disclosure, the determining the touch position of the touch operation according to the touch sensing signals includes: determining a first coordinate of the touch operation according to the touch sensing signals of the electrodes arranged in the first direction, and determining the touch position of the touch operation according to the first coordinate; or determining the first coordinate of the touch operation according to the touch sensing signals of a plurality of electrodes which are included by the electrodes in the plurality of electrode groups of the touch panel and are arranged in the first direction, determining a second coordinate of the touch operation according to the touch sensing signals of another plurality of electrodes which are included by the electrodes in the plurality of electrode groups of the touch panel and are arranged in a second direction, and determining the touch position of the touch operation according to the first coordinate and the second coordinate, wherein the first direction is not parallel to the second direction.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to make the following description of the embodiments of the present disclosure clear and concise, the present disclosure omits detailed descriptions of known functions and known components.

With the rapid development of the electronics industry, the integration of a driving chip is also developing continuously. At the same time as the driving chip is integrated, the driving chip needs to realize more functions, so it is necessary to increase a size of the driving chip, which results in an increase in production cost.

Figure 1:
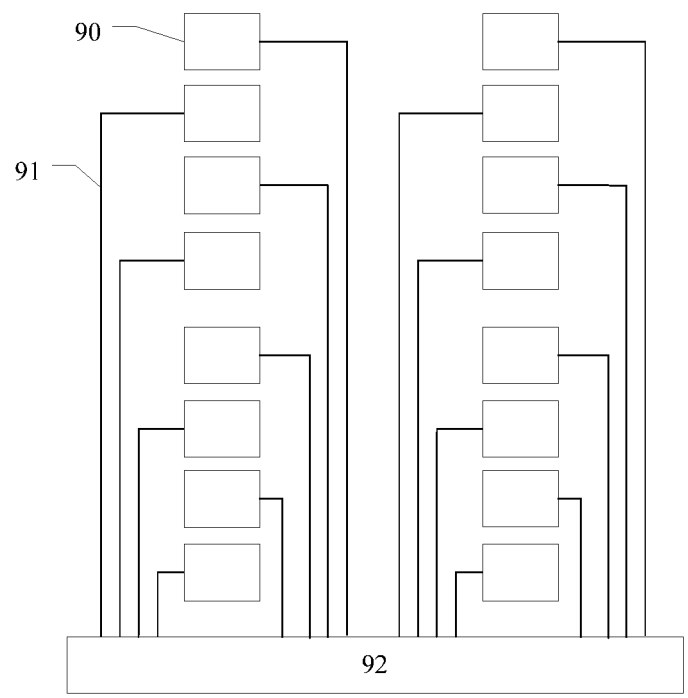
FIG. 1 is a schematic structural plan view of an in-cell touch panel.

FIG. 1 is a schematic structural plan view of an in-cell touch panel. As shown in FIG. 1, in the in-cell touch panel, each self-capacitance electrode 90 is connected with a touch driving chip 92 through a conducting line 91. Because the number of the self-capacitance electrodes 90 is large, the number of the conducting lines 91 respectively connected with the self-capacitance electrodes 90 is also large, and thus there are relatively more pins which are respectively corresponding to the conducting lines 91 and are at the touch driving chip 92, causing that a size of the control driving chip 92 is further increased, and that the cost of the touch driving chip 92 is further increased. In addition, because the number of the conducting lines 91 is large, the in-cell touch panel has a large frame, which is disadvantageous for the narrow bezel design.

The embodiments of the present disclosure provides a touch panel, a driving method of the touch panel and a touch device, in which a plurality of electrodes share one signal line, thereby reducing the number of the signal lines, reducing the size of the touch driving chip, and reducing the production cost; it also reduces drive time, increases refresh rate, reduces power consumption, reduces wiring space of an array, and improves accuracy.

Several embodiments of the present disclosure are described in detail below with reference to the accompanying drawings, but the present disclosure is not limited to these specific embodiments.

Figure 2A:
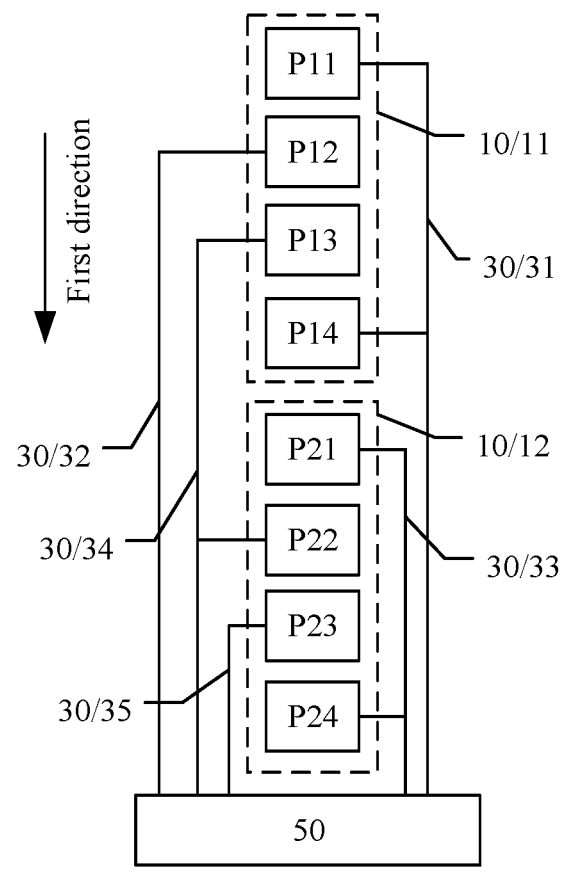
FIG. 2A is a schematic structural plan view of a touch panel according to at least one embodiment of the present disclosure.
Figure 2B:
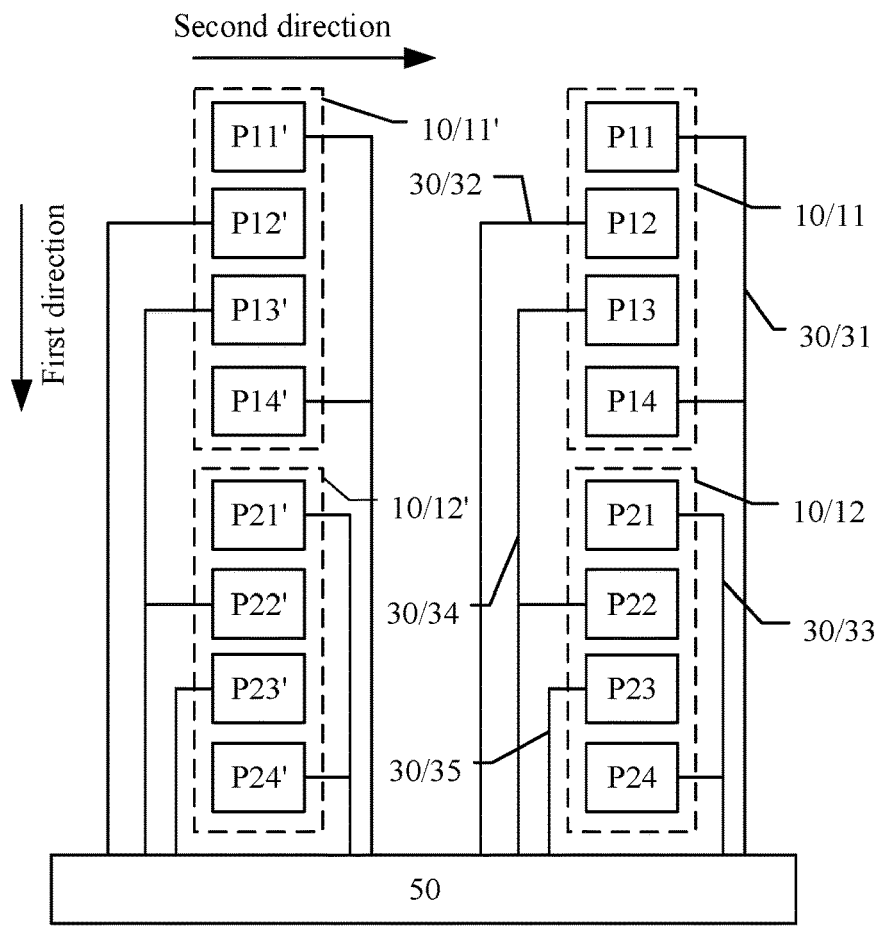
FIG. 2B is another schematic structural plan view of the touch panel according to at least one embodiment of the present disclosure.

FIG. 2A is a schematic structural plan view of the touch panel according to at least one embodiment of the present disclosure, and FIG. 2B is another schematic structural plan view of the touch panel according to at least one embodiment of the present disclosure.

For example, as shown in FIG. 2A, the touch panel provided by the embodiment of the present disclosure includes a plurality of electrode groups 10 and a plurality of signal lines 30. In a first direction, the plurality of electrode groups 10 are sequentially arranged, and the plurality of electrode groups 10 include a head electrode group 11 arranged foremost and a tail electrode group 12 arranged at a rearmost side. The plurality of signal lines 30 include at least a first signal line 31, a second signal line 32 and a third signal line 33.

For example, the head electrode group 11 includes at least a first head electrode P11, a second head electrode P12, a third head electrode P13 and a fourth head electrode P14. The second head electrode P12 and the third head electrode P13 are disposed between the first head electrode P11 and the fourth head electrode P14. The tail electrode group 12 includes at least a first tail electrode P21, a second tail electrode P22, a third tail electrode P23 and a fourth tail electrode P24. The second tail electrode P22 and the third tail electrode P23 are disposed between the first tail electrode P21 and the fourth tail electrode P24.

For example, in the first direction, a plurality of electrodes in each electrode group are located in a same column. For example, as shown in FIG. 2A and FIG. 2B, the first head electrode P11, the second head electrode P12, the third head electrode P13 and the fourth head electrode P14 in the head electrode group 11 are located in a same column; the first tail electrode P21, the second tail electrode P22, the third tail electrode P23 and the fourth tail electrode P24 in the tail electrode group 12 are located in the same column.

For example, the first head electrode P11 and the fourth head electrode P14 are electrically connected with the first signal line 31, the first tail electrode P21 and the fourth tail electrode P24 are electrically connected with the third signal line 33, the second head electrode P12 alone is electrically connected with the second signal line 32, and the second signal line 32 is only electrically connected with the second head electrode P12.

For example, the first head electrode P11 and the fourth head electrode P14 share the first signal line 31, and the first tail electrode P21 and the fourth tail electrode P24 share the third signal line 33. Therefore, the touch panel provided by the embodiment of the present disclosure realizes that a plurality of electrodes share one signal line, thereby reducing the number of the signal lines and the number of connection terminals at the touch driving chip, reducing the size of the touch driving chip, and reducing the production cost.

For example, the touch panel includes a base substrate (not shown in figures), and the plurality of electrode groups 10 and the plurality of signal lines 30 are disposed on the base substrate.

For example, as shown in FIGS. 2A and 2B, the plurality of signal lines 30 further include a fourth signal line 34 and a fifth signal line 35.

For example, as shown in FIG. 2A, in one example, the third head electrode P13 and the second tail electrode P22 are electrically connected with the fourth signal line 34, the third tail electrode P23 alone is electrically connected with the fifth signal line 35, and the fifth signal line 35 is only electrically connected with the third tail electrode P23, so that the eight independent electrodes are electrically connected with a touch chip 50 through five signal lines to realize a touch operation. Each of the second head electrode P12 and the third tail electrode P23 is independently electrically connected with one signal line, thereby eliminating touch blind spots and improving touch accuracy.

For example, as shown in FIG. 2A, in the first direction, the first head electrode P11, the second head electrode P12, the third head electrode P13 and the fourth head electrode P14 are sequentially arranged, and the first tail electrode P21, the second tail electrode P22, the third tail electrode P23 and the fourth tail electrode P24 are also sequentially arranged.

For example, as shown in FIG. 2B, the plurality of electrode groups 10 are arranged in an array to form a plurality of rows and a plurality of columns. In a second direction, a plurality of head electrode groups 11 (for example, a first head electrode group 11 and a second head electrode group 11') are arranged in one row, and the plurality of tail electrode groups 12 (for example, a first tail electrode group 12 and a second tail electrode group 12') is arranged in another row. In the first direction, the first head electrode group 11 and the first tail electrode group 12 are arranged in one column, and the second head electrode group 11' and the second tail electrode group 12' are arranged in another column. As shown in FIGS. 2A and 2B, in the first direction, the first head electrode group 11 corresponds to the first tail electrode group 12, and the first head electrode group 11 and the first tail electrode group 12 are located in a same column. As shown in FIG. 2B, the second head electrode group 11' corresponds to the second tail electrode group 12', and the second head electrode group 11' and the second tail electrode group 12' are located in another same column. The electrodes in the plurality of electrode groups 10 form a self-capacitance electrode array, and thus can be used for touch detection.

For example, the first direction and the second direction are not parallel. As shown in FIG. 2B, the first direction and the second direction are, for example, perpendicular to each other. The first direction is for example a column direction of the plurality of electrode groups 10 or a row direction of the plurality of electrode groups 10; correspondingly, the second direction is for example the row direction of the plurality of electrode groups 10 or the column direction of the plurality of electrode groups 10.

It should be noted that in a situation where the first direction and the second direction are perpendicular to each other, an angle between the first direction and the second direction is 90 degrees, which is not limited thereto; the angle between the first direction and the second direction is for example 45 degrees or the like according to requirements of practical applications. The disclosure does not limit thereto.

For example, the electrodes in the plurality of electrode groups 10 have a same shape, thereby ensuring that electrical characteristics of the electrodes in the plurality of electrode groups 10 are substantially uniform, thereby ensuring the accuracy of touch detection. For example, as shown in FIG. 2A, the electrodes in the plurality of electrode groups 10 are all rectangular. Embodiments of the present disclosure are not limited thereto. The electrodes in the plurality of electrode groups 10, for example, have different shapes.

Figure 3A:
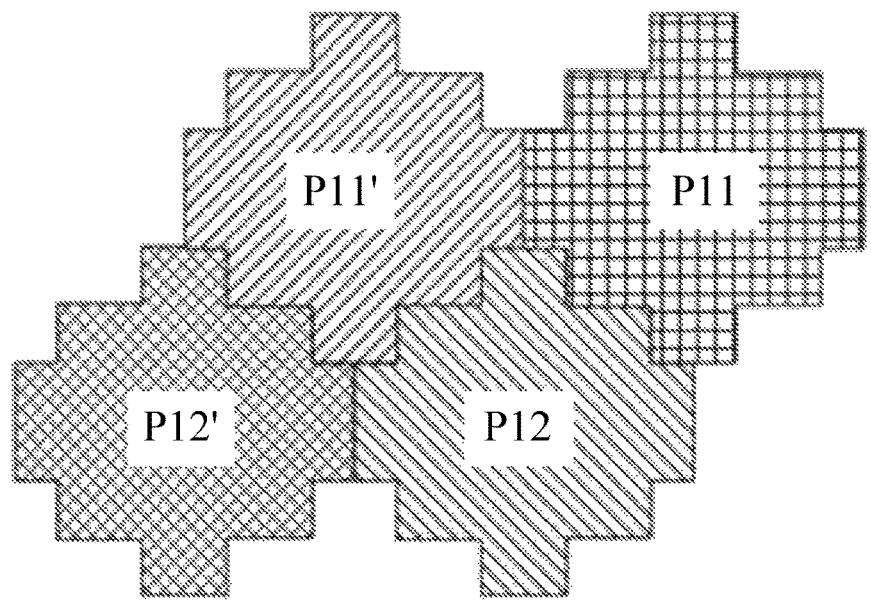
FIG. 3A is a schematic structural view showing that side edges which are included by adjacent electrodes and are opposite to each other are curved, in the touch panel according to at least one embodiment of the present disclosure.
Figure 3B:
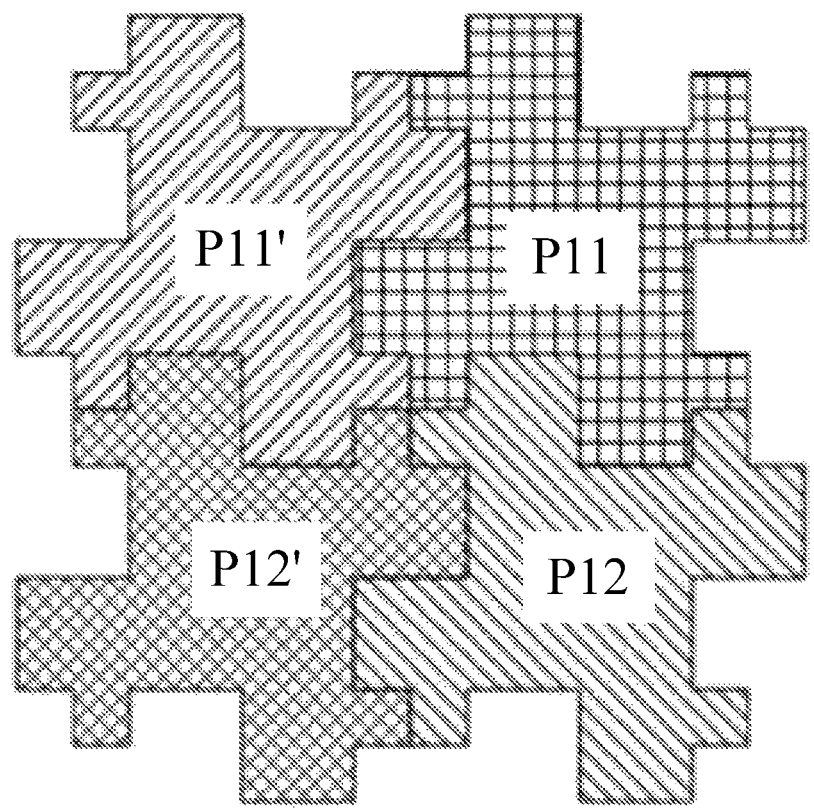
FIG. 3B is another schematic structural view showing that the side edges which are included by the adjacent electrodes and are opposite to each other are curved, in the touch panel according to at least one embodiment of the present disclosure.

FIG. 3A is a schematic structural view illustrating that side edges which are included by adjacent electrodes and are opposite to each other are curved in the touch panel according to at least one embodiment of the present disclosure; FIG. 3B is another schematic structural view illustrating that the side edges which are included by the adjacent electrodes and are opposite to each other are curved in the touch panel according to at least one embodiment of the present disclosure.

For example, the shape of the electrodes in the plurality of electrode groups 10 is a regular shape such as a square, a rectangle, a triangle, a trapezoid or a circle, or the like. The shape of the electrodes in the plurality of electrode groups 10 is, for example, irregular. For example, each of side edges which are included by the adjacent two electrodes and are opposite to each other has a curved shape, and the curved shapes match each other. As shown in FIG. 3A, in one example, each of the side edges which are included by the two adjacent electrodes (for example, the first head electrode P11' and the first head electrode P11 which are adjacent to each other, the second head electrode P12' and the second head electrode P12 which are adjacent to each other) and are opposite to each other has a step structure, and the two step structures have a same shape and match each other. As shown in FIG. 3B, in another example, each of the side edges which are included by the two adjacent electrodes (for example, the first head electrode P11' and the first head electrode P11 which are adjacent to each other, the second head electrode P12' and the second head electrode P12 which are adjacent to each other) and are opposite to each other has a concave-convex structure, and shapes of the two concave-convex structures are centrosymmetrical to each other and match each other.

For example, the plurality of electrode groups 10 are located in a same layer. As shown in FIG. 2A, the head electrode group 11 and the tail electrode group 12 are located in a same layer, that is, the first head electrode P11, the second head electrode P12, the third head electrode P13, the fourth head electrode P14, the first tail electrode P21, the second tail electrode P22, the third tail electrode P23 and the fourth tail electrode P24 are all located in the same layer, so that the touch panel is a single-layer multi-point in-cell touch panel. However, embodiments are not limited thereto; the touch panel may be other types of panels, such as an on-cell touch panel. The disclosure does not limit this.

For example, as shown in FIG. 2A, the plurality of signal lines 30 are insulated from each other and are electrically connected with the touch chip 50. The electrodes in the plurality of electrode groups 10 (for example, the first head electrode P11, the second head electrode P12, the first tail electrode P21, the second tail electrode P22, etc.) are independent of each other, and the touch chip 50 detects capacitance variations of respective electrodes in the plurality of electrodes 10 through the plurality of signal lines 30 respectively, so as to determine a touch position. If a touch point overlaps two or more adjacent electrodes, the touch chip 50 accurately calculates the touch position according to, for example, the capacitance variations of the two or more adjacent electrodes.

For example, the plurality of signal lines 30 are parallel to each other and extend in a same direction. As shown in FIG. 2A, the first signal line 31, the second signal line 32, the third signal line 33, the fourth signal line 34 and the fifth signal line 35 extend in the first direction. However, the present disclosure is not limited thereto; for example, the plurality of signal lines 30 extend in different directions, in which case, the plurality of signal lines 30 are, for example, formed in different layers; for example, the first signal line 31 and the third signal line 33 are in different layers to insulate each other.

For example, the first signal line 31 and the third signal line 33 are located on a first side of the head electrode group 11 and the tail electrode group 12, and the second signal line 32, the fourth signal line 34 and the fifth signal line 35 are located on a second side of the head electrode group 11 and the tail electrode group 12, so as to prevent the first signal line 31, the second signal line 32, the third signal line 33, the fourth signal line 34 and the fifth signal line 35 from crossing each other, and to make the first signal line 31, the second signal line 32, the third signal line 33, the fourth signal line 34 and the fifth signal line 35 are located, for example, in a same layer. For example, as shown in FIG. 2A, the first side of the head electrode group 11 and the tail electrode group 12 is a right side, and the second side of the head electrode group 11 and the tail electrode group 12 is a left side.

For example, the plurality of signal lines 30 are located in the same layer. As shown in FIG. 2A, the first signal line 31, the second signal line 32, the third signal line 33, the fourth signal line 34 and the fifth signal line 35 are located, for example, in the same layer. In a preparation process, the plurality of signal lines 30 (for example, the first signal line 31, the second signal line 32, the third signal line 33, the fourth signal line 34 and the fifth signal line 35) are formed by a same metal film and a same patterning process, thereby simplifying the manufacturing process of the touch panel, saving production cost and facilitating wiring. However, embodiments are not limited thereto, and for example, the plurality of signal lines 30 are located in different layers.

For example, the plurality of signal lines 30 and the plurality of electrode groups 10 are located in the same layer, thereby reducing a thickness of the touch panel and saving manufacturing costs. For example, as shown in FIG. 2A, the first signal line 31, the second signal line 32, the third signal line 33, the fourth signal line 34, the fifth signal line 35 and the plurality of electrode groups 10 (for example, the head electrode group 11 and the tail electrode group 12) are located in the same layer.

Figure 4A:
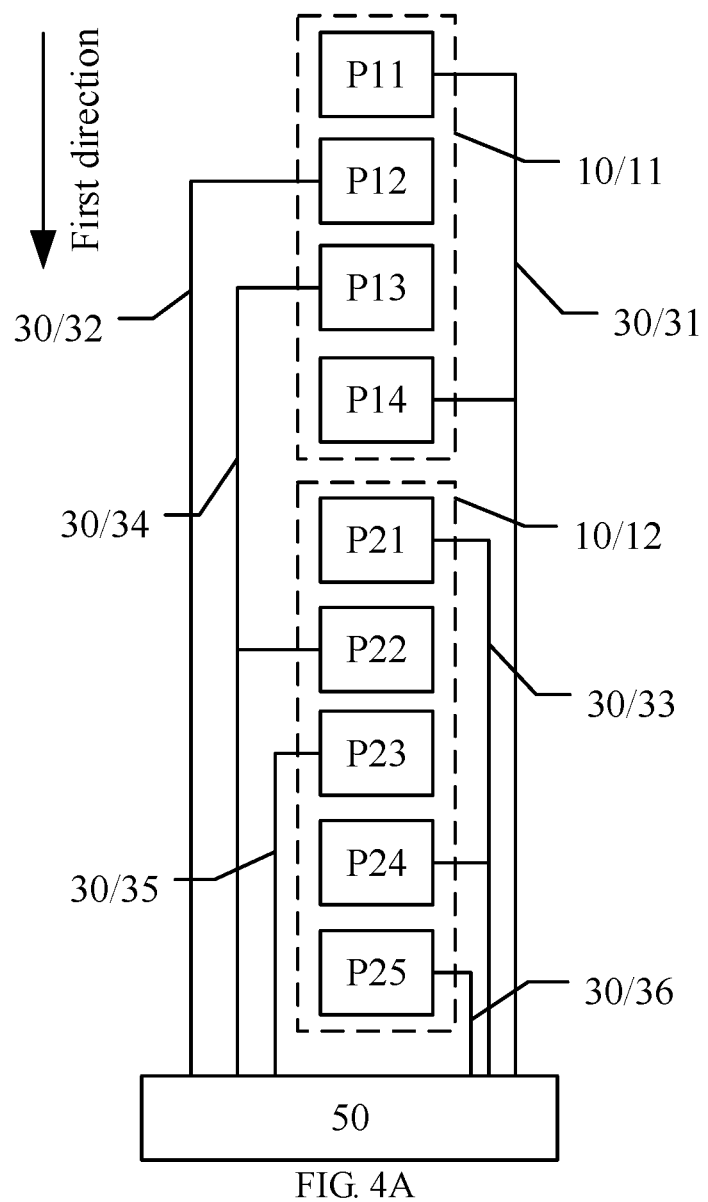
FIG. 4A is still another schematic plan view of the touch panel according to at least one embodiment of the present disclosure.
Figure 4B:
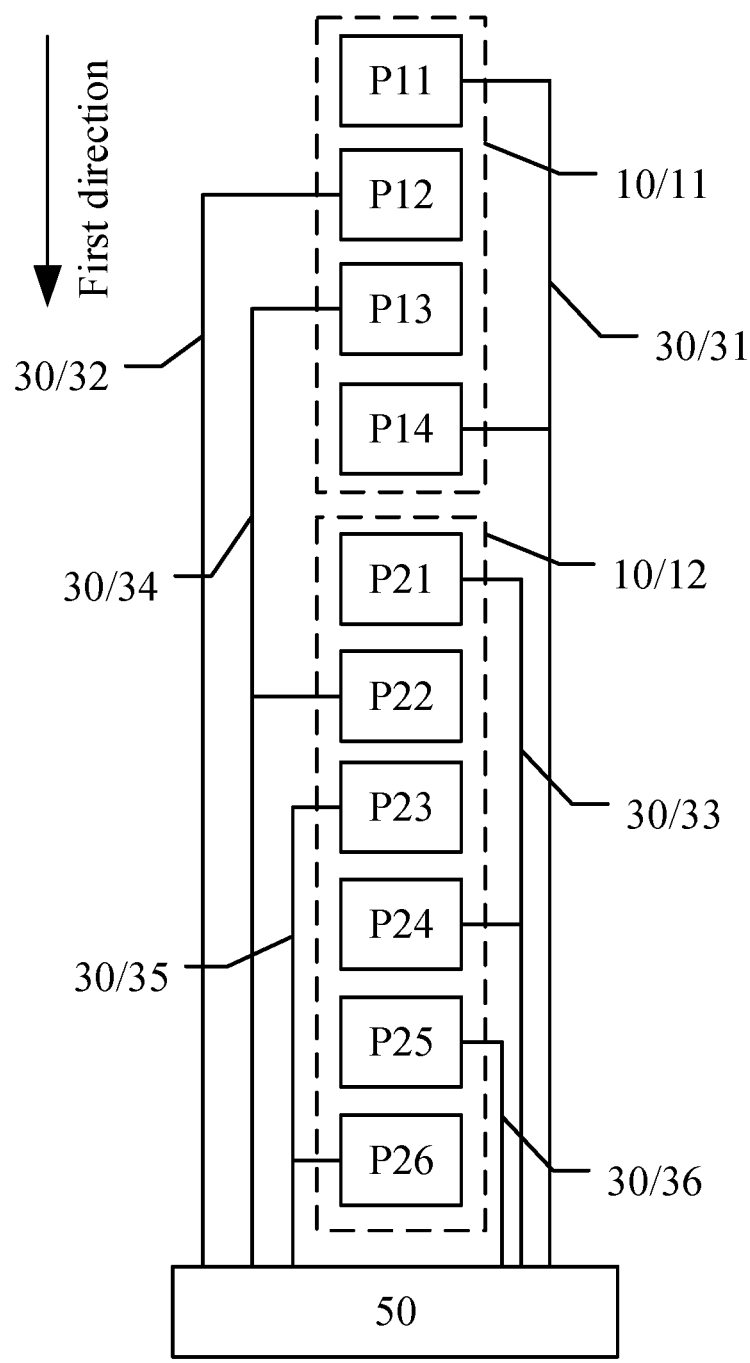
FIG. 4B is still another schematic plan view of the touch panel according to at least one embodiment of the present disclosure.
Figure 4C:
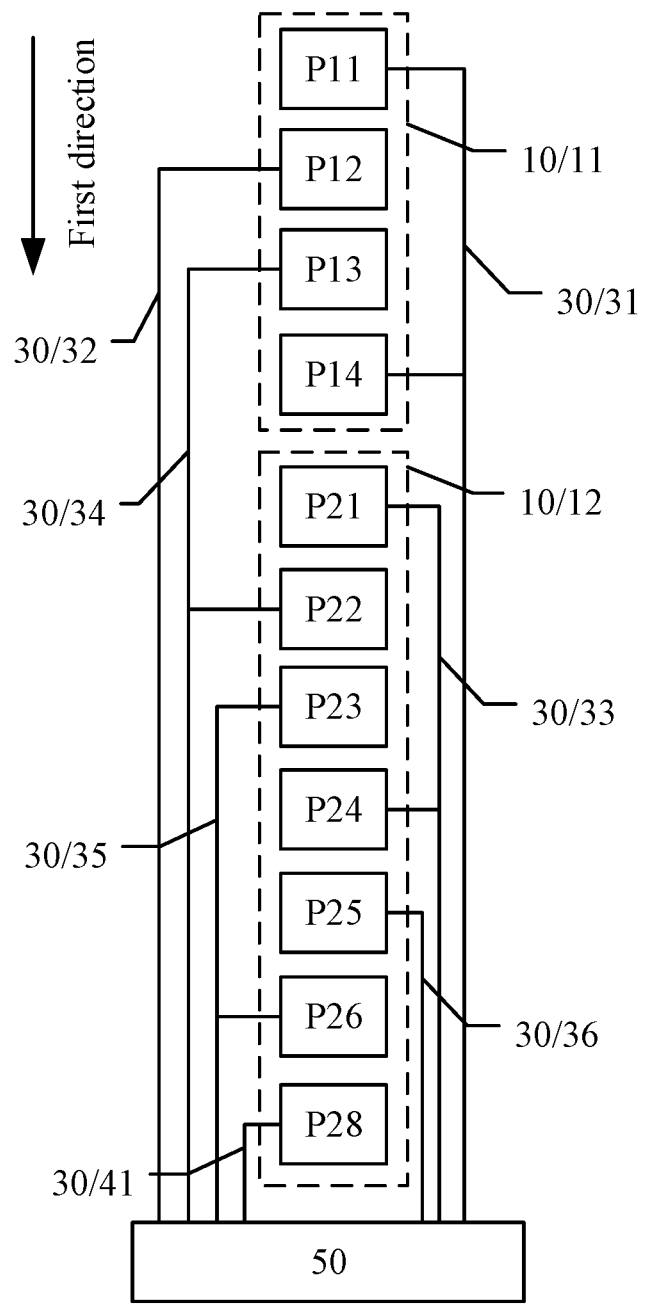
FIG. 4C is still another schematic plan view of the touch panel according to at least one embodiment of the present disclosure.

FIG. 4A is another schematic plan view of the touch panel according to at least one embodiment of the present disclosure, FIG. 4B is still another schematic plan view of the touch panel according to at least one embodiment of the present disclosure, and FIG. 4C is still another schematic plan view of the touch panel according to at least one embodiment of the present disclosure.

For example, the tail electrode group 12 includes five tail electrodes, as shown in FIG. 4A. In one example, the tail electrode group 12 includes, the first tail electrode P21, the second tail electrode P22, the third tail electrode P23, the fourth tail electrode P24 and a fifth tail electrode P25, and the plurality of signal lines 30 further includes a sixth signal line 36. The third head electrode P13 and the second tail electrode P22 are electrically connected with the fourth signal line 34, the third tail electrode P23 alone is electrically connected with the fifth signal line 35, and the fifth tail electrode P25 alone is electrically connected with the sixth signal line 36. That is, the fifth signal line 35 is only electrically connected with the third tail electrode P23, and the sixth signal line 36 is only electrically connected with the fifth tail electrode P25.

For example, as shown in FIG. 4A, in the first direction, the first tail electrode P21, the second tail electrode P22, the third tail electrode P23, the fourth tail electrode P24 and the fifth tail electrode P25 are sequentially arranged.

For example, the tail electrode group 12 includes six tail electrodes, as shown in FIG. 4B. In still another example, the tail electrode group 12 includes the first tail electrode P21, the second tail electrode P22, the third tail electrode P23, the fourth tail electrode P24, the fifth tail electrode P25 and a sixth tail electrode P26, and the plurality of signal lines 30 further includes a sixth signal line 36. The third head electrode P13 and the second tail electrode P22 are electrically connected with the fourth signal line 34, and the fifth tail electrode P25 alone is electrically connected with the sixth signal line 36; that is, the sixth signal line 36 is only electrically connected with the fifth tail electrode P25, and the third tail electrode P23 and the sixth tail electrode P26 are electrically connected with the fifth signal line 35.

For example, as shown in FIG. 4B, in the first direction, the first tail electrode P21, the second tail electrode P22, the third tail electrode P23, the fourth tail electrode P24, the fifth tail electrode P25 and the sixth tail electrode P26 are sequentially arranged.

For example, the tail electrode group 12 includes seven tail electrodes, as shown in FIG. 4C. In another example, the tail electrode group 12 includes the first tail electrode P21, the second tail electrode P22, the third tail electrode P23, the fourth tail electrode P24, the fifth tail electrode P25, the sixth tail electrode P26 and an eighth tail electrode P28, and the plurality of signal lines 30 further includes the sixth signal line 36 and an eleventh signal line 41. The third head electrode P13 and the second tail electrode P22 are electrically connected with the fourth signal line 34, the fifth tail electrode P25 alone is electrically connected with the sixth signal line 36, and the third tail electrode P23 and the sixth tail electrode P26 are electrically connected with the fifth signal line 35, and the eighth tail electrode P28 alone is electrically connected with the eleventh signal line 41.

For example, as shown in FIG. 4C, in the first direction, the first tail electrode P21, the second tail electrode P22, the third tail electrode P23, the fourth tail electrode P24, the fifth tail electrode P25, the sixth tail electrode P26 and the eighth tail electrode P28 are sequentially arranged.

In summary, in a situation where the tail electrode group 12 includes six electrodes or seven electrodes, the third tail electrode P23 and the sixth tail electrode P26 share the fifth signal line 35. The tail electrode group 12 includes four, five, six or seven tail electrodes, depending on actual situations.

For example, the sixth signal line 36 and the eleventh signal line 41 are located on two sides of the head electrode group 11 and the tail electrode group 12, respectively; for example, as shown in FIG. 4C, the sixth signal line 36 is located on the first side of the head electrode group 11 and the tail electrode group 12, and the eleventh signal line 41 is located on the second side of the head electrode group 11 and the tail electrode group 12. However, embodiments are not limited thereto, and the sixth signal line 36 and the eleventh signal line 41 are located, for example, on a same side such as the first side of the head electrode group 11 and the tail electrode group 12.

For example, the sixth signal line 36 and the eleventh signal line 41 are located in the same layer as the remaining signal lines (i.e., the first line to the fourth signal line) among the plurality of signal lines 30.

It should be noted that connection manners of the remaining electrodes in the examples shown in FIG. 4A to FIG. 4C are the same as those in the example shown in FIG. 2A, and repeated descriptions are omitted herein. In addition, the descriptions of the first tail electrode to the fourth tail electrode are equally applicable to the fifth tail electrode to the seventh tail electrode without conflict.

Figure 5:
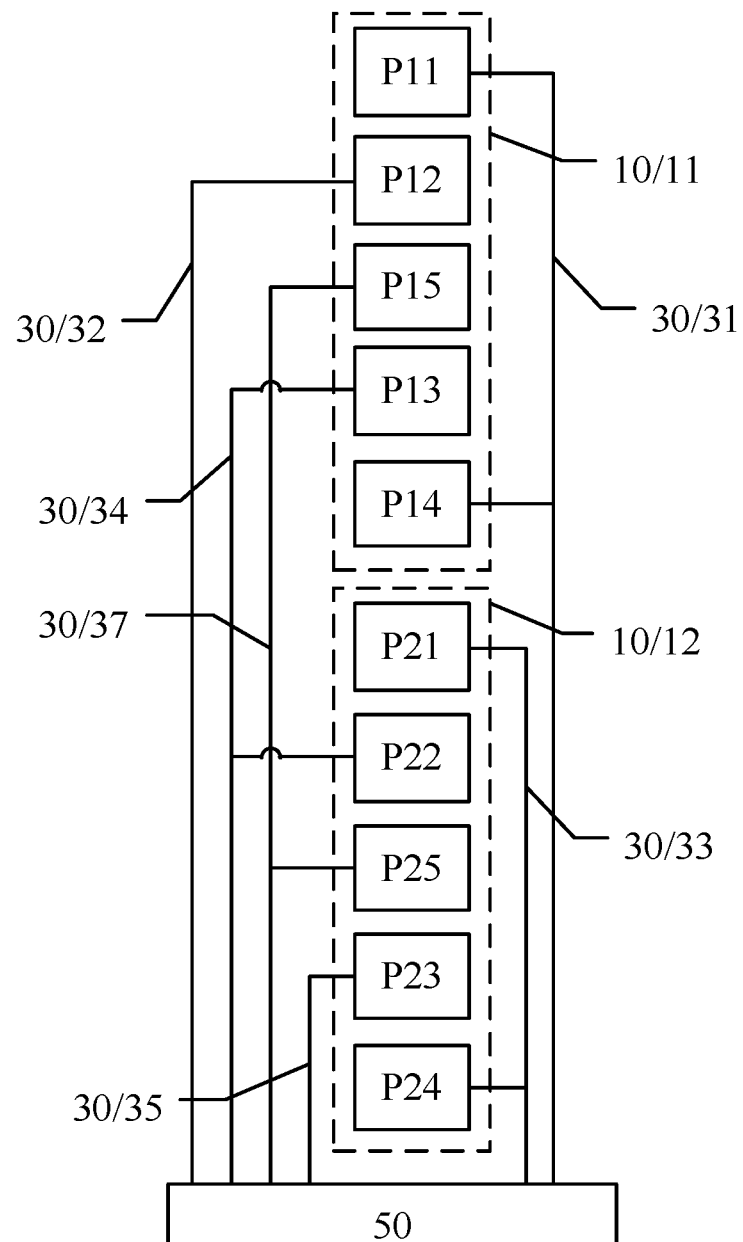
FIG. 5 is still another schematic plan view of the touch panel according to at least one embodiment of the present disclosure.

FIG. 5 is a schematic plan view of the touch panel according to at least one embodiment of the present disclosure.

For example, in the touch panel shown in FIGS. 2A, 2B and 4A to 4C, in the plurality of electrode groups 10, each electrode group includes four electrodes except the tail electrode group 12. As shown in FIG. 5, in at least one embodiment, in the plurality of electrode groups 10, each electrode group includes five electrodes in addition to the tail electrode group 12. The tail electrode group 12, for example, includes five, six, seven, eight or nine tail electrodes, depending on the actual situations.

For example, as shown in FIG. 5, in one example, the head electrode group 11 includes the first head electrode P11, the second head electrode P12, the third head electrode P13, the fourth head electrode P14 and a fifth head electrode P15, the tail electrode group 12 includes the first tail electrode P21, the second tail electrode P22, the third tail electrode P23, the fourth tail electrode P24 and the fifth tail electrode P25, and the plurality of signal lines 30 further includes a seventh signal line 37. The fifth head electrode P15 and the fifth tail electrode P25 are electrically connected with the seventh signal line 37.

For example, as shown in FIG. 5, the fifth head electrode P15 is located between the second head electrode P12 and the third head electrode P13, and the fifth tail electrode P25 is located between the second tail electrode P22 and the third tail electrode P23.

For example, as shown in FIG. 5, the seventh signal line 37 and the fourth signal line 34 cross each other. To prevent the signal lines from interfering with each other, the seventh signal line 37 and the fourth signal line 34 are, for example, located in different layers, respectively. Thus, the seventh signal line 37 is located in a layer different from the layer where the remaining signal lines among the plurality of signal lines 30 are located; that is, the seventh signal line 37 is located in the layer different from the layer where at least one of the first signal line 31, the second signal line 32, the third signal line 33, the fourth signal line 34 and the fifth signal line 35 is located. For example, the first signal line 31, the second signal line 32, the third signal line 33, the fourth signal line 34 and the fifth signal line 35 are located in the same layer, and the seventh signal line 37 and the first signal line 31 are respectively located in different layers. For example, the first signal line 31, the second signal line 32, the third signal line 33, the fourth signal line 34 and the fifth signal line 35 are located in a first layer, the seventh signal line 37 is located in a second layer, and an insulating layer is disposed between the first layer and the second layer to insulate the first layer and the second layer.

For example, the seventh signal line 37 is located in a layer different from the layer where the fifth head electrode P15 and the fifth tail electrode P25 are located. For example, the fifth head electrode P15 and the fifth tail electrode P25 are located in the first layer, the seventh signal line 37 is located in the second layer, and the seventh signal line 37 is electrically connected with each of the fifth head electrode P15 and the fifth tail electrode P25 through a via hole in the insulating layer between the first layer and the second layer.

It should be noted that connection manners of the remaining electrodes in the example shown in FIG. 5 are the same as those in the example shown in FIG. 2A, and the repeated descriptions are omitted herein.

It is to be noted that each of the plurality of electrode groups 10 further includes, for example, six electrodes, seven electrodes, or the like according to actual needs. The disclosure does not limit this.

Figure 6A:
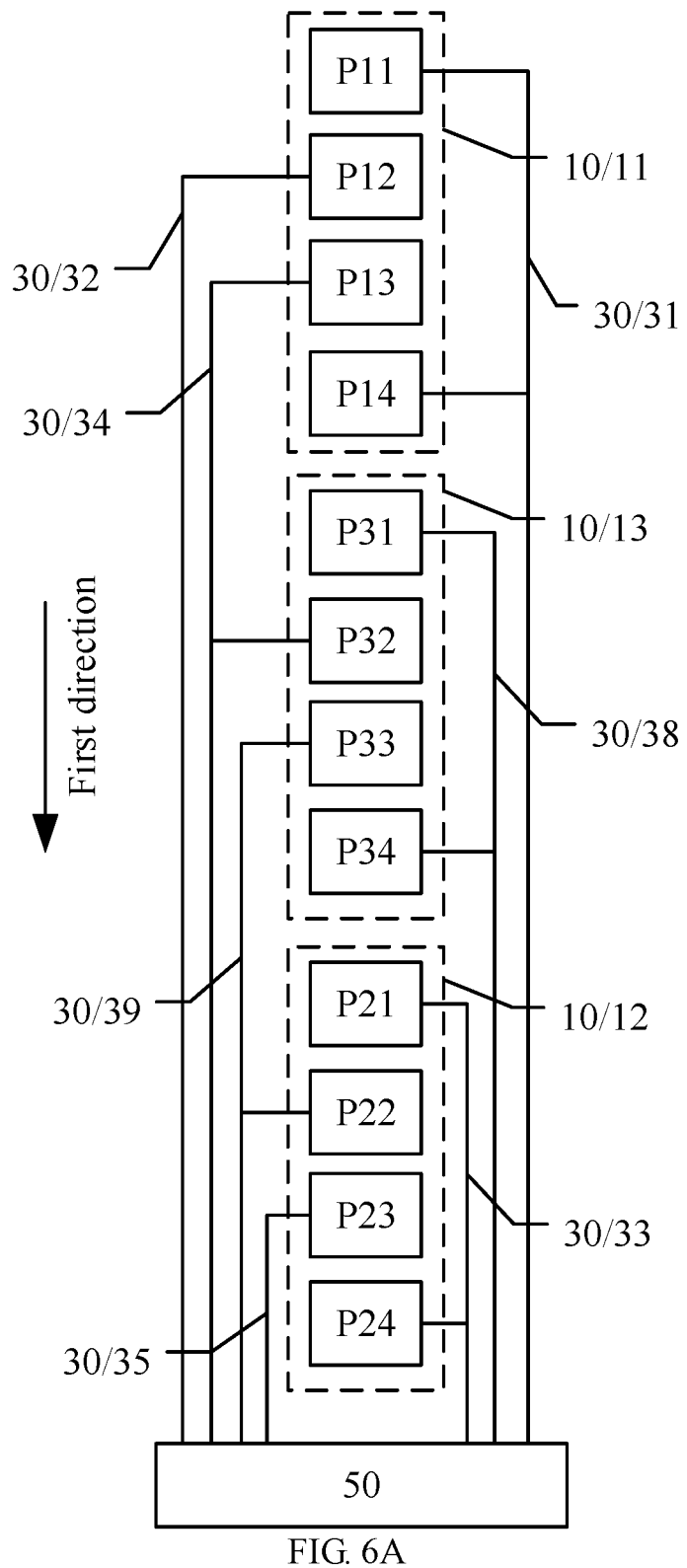
FIG. 6A is still another schematic plan view of the touch panel according to at least one embodiment of the present disclosure.
Figure 6B:
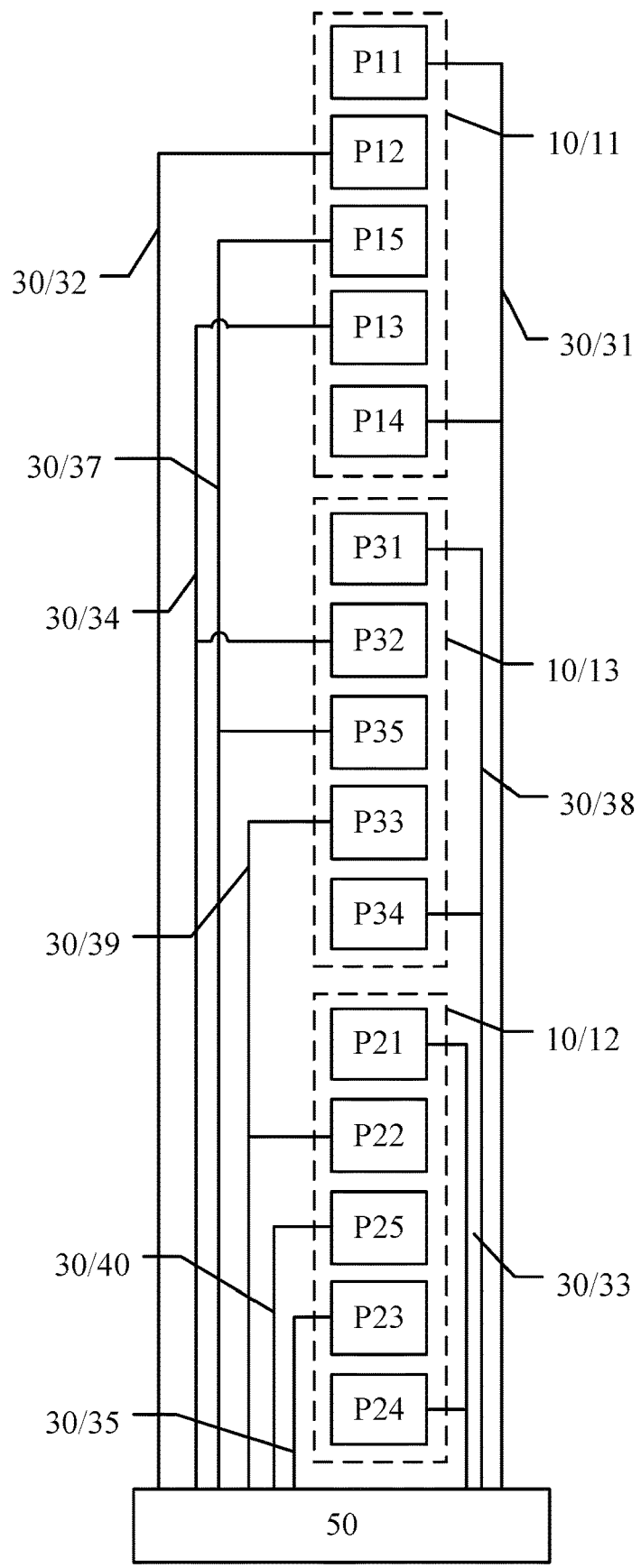
FIG. 6B is still another schematic plan view of the touch panel according to at least one embodiment of the present disclosure.

FIG. 6A is another schematic plan view of the touch panel according to at least one embodiment of the present disclosure, and FIG. 6B is still another schematic plan view of the touch panel according to at least one embodiment of the present disclosure.

For example, as shown in FIG. 6A, the plurality of electrode groups 10 further includes an intermediate electrode group 13. In the first direction, the head electrode group 11, the intermediate electrode group 13 and the tail electrode group 12 are located in the same column, the intermediate electrode group 13 is located between the head electrode group 11 and the tail electrode group 12, and the plurality of signal lines 30 further includes an eighth signal line 38 and a ninth signal line 39. The intermediate electrode group 13 includes at least a first intermediate electrode P31, a second intermediate electrode P32, a third intermediate electrode P33 and a fourth intermediate electrode P34. The second intermediate electrode P32 and the third intermediate electrode P33 are located between the first intermediate electrode P31 and the fourth intermediate electrode P34.

For example, as shown in FIG. 6A, in the first direction, the first intermediate electrode P31, the second intermediate electrode P32, the third intermediate electrode P33 and the fourth intermediate electrode P34 are sequentially arranged.

For example, as shown in FIG. 6A, the first intermediate electrode P31 and the fourth intermediate electrode P34 are electrically connected with the eighth signal line 38, the third head electrode P13 and the second intermediate electrode P32 are electrically connected with the fourth signal line 34, and the third intermediate electrode P33 and the second tail electrode P22 are electrically connected with the ninth signal line 39. That is, for the intermediate electrode group 13, the second intermediate electrode P32 shares one signal line with the third electrode (the third head electrode P13 in FIG. 6A) of the previous electrode group adjacent to the intermediate electrode group 13, and the third intermediate electrode P33 shares one signal line with the second electrode (the second tail electrode P22 in FIG. 6A) of the next electrode group adjacent to the intermediate electrode group 13, and so on, thereby achieving electrical connections between the signal lines and the electrodes. Thus, in addition to the head electrode group 11 and the tail electrode group 12, in the remaining electrode group, two electrodes are electrically connected with a same signal line, thereby reducing the number of signal lines.

For example, as shown in FIG. 6B, the head electrode group 11 further includes the fifth head electrode P15, the tail electrode group 12 further includes the fifth tail electrode P25, and the intermediate electrode group 13 further includes a fifth intermediate electrode P35. The plurality of signal lines 30 further includes, for example, a tenth signal line 40. The fifth head electrode P15 is electrically connected with the seventh signal line 37. The fifth tail electrode P25 is electrically connected with the tenth signal line 40. The fifth intermediate electrode P35 is electrically connected with the seventh signal line 37; or, the fifth intermediate electrode P35 is electrically connected with the tenth signal line 40. That is, the fifth intermediate electrode P35 shares one signal line with the fifth electrode (the fifth head electrode P15 in FIG. 6B) in the previous electrode group adjacent to the intermediate electrode group, or shares one signal line with the fifth electrode (for example, the fifth tail electrode P25) in the next electrode group adjacent to the intermediate electrode group.

For example, FIGS. 6A and 6B show only one intermediate electrode group 13. However, embodiments are not limited thereto; for example, a plurality of intermediate electrode groups are between the head electrode group 11 and the tail electrode group 12, and the head electrode group 11, the plurality of intermediate electrode groups and the tail electrode group 12 are located in the same column in the first direction.

Figure 7:
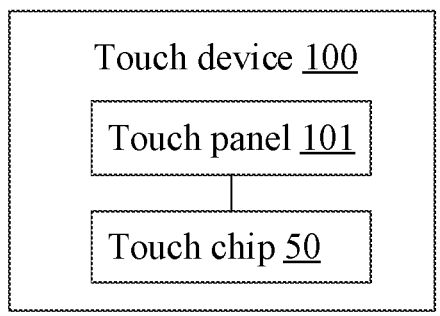
FIG. 7 is a schematic block diagram of a touch device according to at least one embodiment of the present disclosure.

FIG. 7 is a schematic block diagram of the touch device according to at least one embodiment of the present disclosure.

For example, as shown in FIG. 7, the touch device 100 according to the embodiment of the present disclosure includes the touch panel 101 described in any one of the above embodiments.

For example, the touch panel 101 is a rectangular touch panel, a circular touch panel, an elliptical touch panel, or a polygonal touch panel or the like. In addition, the touch panel 101 is, for example, a flat touch panel, or a curved touch panel or even a spherical touch panel.

For example, the touch panel 101 is of any one of various types, such as an OGS (one glass solution) type touch panel, an in-cell touch panel, or an on-cell touch panel.

For example, the touch device 100 can be any product or component having a touch function, such as a mobile phone, a tablet computer, a television, a display, a notebook computer, a digital photo frame, a navigator, and the like.

For example, as shown in FIG. 2A and FIG. 7, the touch device 100 further includes the touch chip 50. The plurality of signal lines of the touch panel 101 are electrically connected with the touch chip 50. The touch chip 50 is configured to apply a touch drive signal to the electrodes in the plurality of electrode groups of the touch panel 101 through the plurality of signal lines. The touch chip 50 is further configured to read touch sensing signals of the electrodes in the plurality of electrode groups of the touch panel 101 through the plurality of signal lines to determine the touch position, thereby realizing touch detection.

For example, the touch chip 50 is provided independently or integrated with other computing devices; for example, the touch chip 50 is a dedicated computing device (for example, a digital processor (DSP), etc.) or a general-purpose computing device (for example, a central processing unit (CPU).

For example, the touch device 100 further includes a display panel (not shown). The display panel is configured to overlap the touch panel 101 and is configured to display an image. For example, the touch panel 101 is disposed on a display side of the display panel, or the touch panel 101 shares partial components with the display panel. For example, the base substrate of the touch panel 101 is a display side substrate of the display panel.

For another example, the touch panel 101 is further configured to display an image, that is, the touch panel 101 and the display panel are integrated. In other words, the touch electrode groups (i.e., the head electrode group 11 and the tail electrode group 12 shown in FIG. 2A) for realizing the touch function are, for example, integrated in the display panel to realize integration of touch and display, thereby reducing production cost, reducing the volume and weight of the display panel, and increasing the additional value of the product.

For example, the touch panel 101 includes a first substrate (i.e., the base substrate) and a second substrate, and the first substrate and the second substrate are opposite to each other. The plurality of electrode groups are disposed on a side of the first substrate away from the second substrate. A plurality of display pixels arranged in a plurality of rows and a plurality of columns are disposed on the second substrate to realize a display function. The first substrate is disposed on a display side of the touch panel 101, and the plurality of electrode groups are disposed on a light exiting side of the first substrate.

For example, in a situation where the touch panel 101 is configured to display an image, the electrodes in the plurality of electrode groups are transparent electrodes. The material of the transparent electrodes include, for example, indium tin oxide (ITO), indium zinc oxide (IZO), zinc oxide (ZnO), indium oxide ($In_2O_3$), aluminum zinc oxide (AZO), carbon nanotubes, or the like.

It should be noted that other components of the touch device 100 (such as a controller device, an image data encoding/decoding device, a row scan driver, a column scan driver, a clock circuit, etc.) can be understood by those skilled in the art, which are not described herein and are not limitative to the present disclosure.

Figure 8:
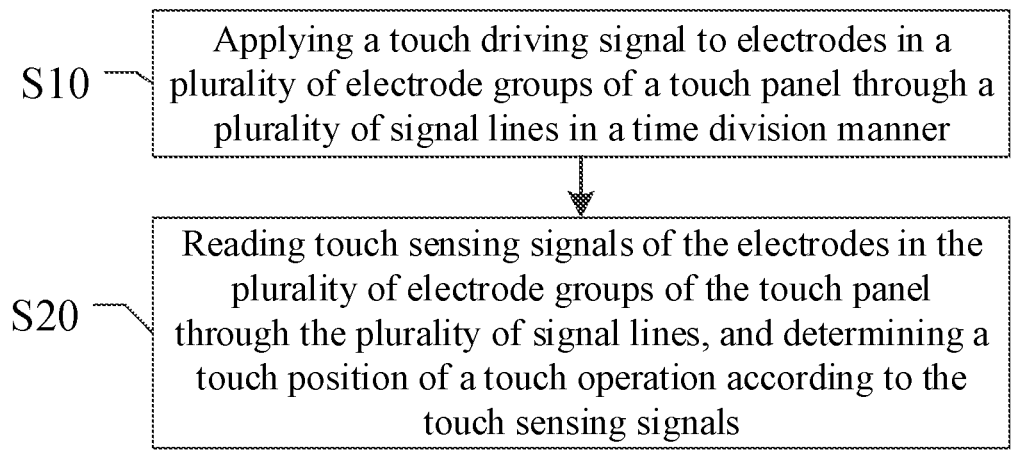
FIG. 8 is a flowchart of a driving method of the touch panel according to at least one embodiment of the present disclosure.

FIG. 8 is a flowchart of a driving method of a touch panel according to at least one embodiment of the present disclosure.

For example, the driving method of the touch panel provided by the embodiment of the present disclosure is applied to the touch panel described in any one of the above embodiments. As shown in FIG. 8, the driving method includes the following steps:

S10: applying the touch driving signal to the electrodes in the plurality of electrode groups of the touch panel through the plurality of signal lines in a time division manner.

S20: reading the touch sensing signals of the electrodes in the plurality of electrode groups of the touch panel through the plurality of signal lines, and determining a touch position of a touch operation according to the touch sensing signals.

In the driving method provided by the embodiment of the present disclosure, because the number of signal lines is reduced, the driving time is reduced, the refresh rate is increased, and power consumption is reduced.

For example, in step S10, the touch chip generates and outputs the touch driving signal, and then the plurality of signal lines simultaneously transmits the touch driving signal to the respective electrodes in the plurality of electrode groups.

For example, the touch drive signal is a pulse voltage signal.

For example, in step S20, the determining the touch position of the touch operation according to the touch sensing signals includes: determining a first coordinate of the touch operation according to the touch sensing signals of the plurality of electrodes located in the first direction, and determining the touch position of the touch operation according to the first coordinate; or determining the first coordinate of the touch operation according to the touch sensing signals of the electrodes located in the first direction, determining a second coordinate of the touch operation according to the touch sensing signals of the electrodes located in the second direction, and determining the touch position of the touch operation according to the first coordinate and the second coordinate. The first direction is not parallel to the second direction.

For example, the first direction and the second direction are perpendicular to each other. The first direction shown in FIG. 2B is a column direction, the second direction shown in FIG. 2B is a row direction, the first coordinate is a longitudinal ordinate and the second coordinate is an abscissa.

The operation process of the driving method will be described in detail below by taking the touch panel shown in FIG. 2A and FIG. 2B as an example. FIG. 9A to 9D illustrate touch diagrams for detecting the first coordinate of the touch operation.

Figure 9A:
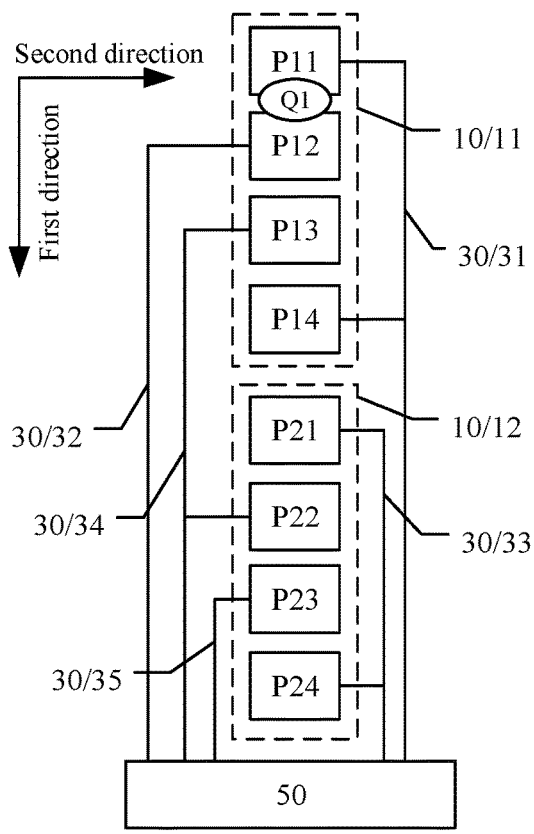
FIG. 9A is a schematic touch diagram illustrating detection of a first coordinate of a touch operation according to at least one embodiment of the present disclosure.

For example, as shown in FIG. 9A, the touch operation occurs at a Q1 point, the Q1 point partially overlaps both the first head electrode P11 and the second head electrode P12, so that a capacitance of the first head electrode P11 and a capacitance of the second head electrode P12 are changed, and a capacitance signal of the first signal line 31 and a capacitance signal of the second signal line 32 are both changed. In a situation where the touch chip detects that the capacitance signal of the first signal line 31 is changed, it is determined that a capacitance of the first head electrode P11 or a capacitance of the fourth head electrode P14 is changed; in a situation where the touch chip detects that the capacitance signal of the second signal line 32 is changed, it is determined that a capacitance of the second head electrode P12 is changed; because a capacitance signal of the fourth signal line 34 is not changed, a capacitance of the third head electrode P13 is not changed; thus, it is determined that the touch point Q1 is located between the first head electrode P11 and the second head electrode P12. Therefore, the touch chip determines the first coordinate of the touch position of the touch operation by detecting a variation of the capacitance signal of the first signal line 31 and a variation of the capacitance signal of the second signal line 32.

For example, the larger the area of an overlap region between the electrode and the Q1 point, the larger the variation of the capacitance signal of the signal line electrically connected with the electrode, so the touch chip accurately determines the touch position of the touch operation based on values of the variation of the capacitance signal of the first signal line 31 and the variation of the capacitance signal of the second signal line 32. For example, the area of the overlap region between the Q1 point and the first head electrode P11 is Y11, the area of the overlap region between the Q1 point and the second head electrode P12 is Y12. If Y11 is greater than Y12, the variation of the capacitance signal of the first signal line 31 is greater than the variation of the capacitance signal of the second signal line 32, so that it is determined that a center of the Q1 point is closer to the first head electrode P11 in the first direction. If Y11 is smaller than Y12, the variation of the capacitance signal of the first signal line 31 is smaller than the variation of the capacitance signal of the second signal line 32, so that it is determined that the center of the Q1 point is closer to the second head electrode P12 in the first direction. If Y11 is equal to Y12, the variation of the capacitance signal of the first signal line 31 is equal to the variation of the capacitance signal of the second signal line 32, and if the shapes of the first head electrode P11 and the second head electrode P12 are regular rectangle, then it is determined that the center of the Q1 point is located at a midpoint of a line connecting a center of the first head electrode P11 and a center of the second head electrode P12 in the first direction.

Figure 9B:
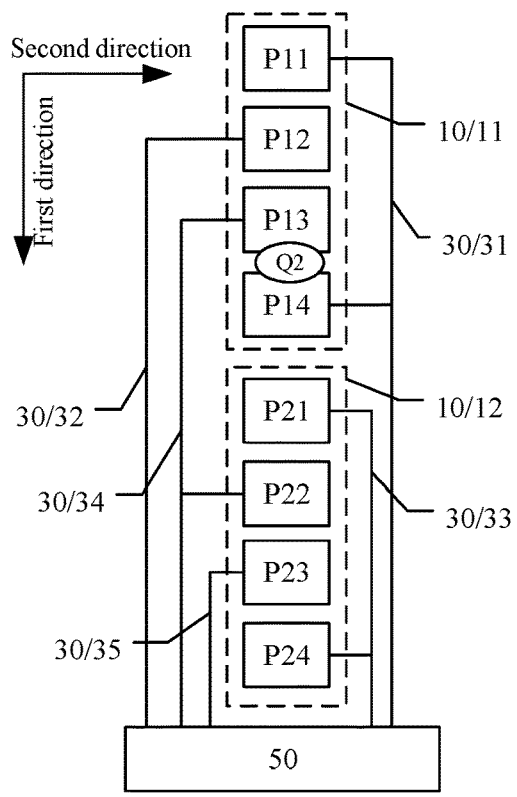
FIG. 9B is another schematic touch diagram illustrating the detection of the first coordinate of the touch operation according to at least one embodiment of the present disclosure.

For example, as shown in FIG. 9B, the touch operation occurs at a Q2 point, the Q2 point partially overlaps each of the third head electrode P13 and the fourth head electrode P14, so that a capacitance of the third head electrode P13 and a capacitance of the fourth head electrode P14 are changed, and a capacitance signal of the first signal line 31 and a capacitance signal of the fourth signal line 34 are both changed. The touch chip, for example, determines the first coordinate of the touch position of the touch operation by detecting a variation of the capacitance signal of the first signal line 31 and a variation of the capacitance signal of the fourth signal line 34. For the specific detection process of the Q2 point, reference may be made to the above description of the detection process of the Q1 point.

Figure 9C:
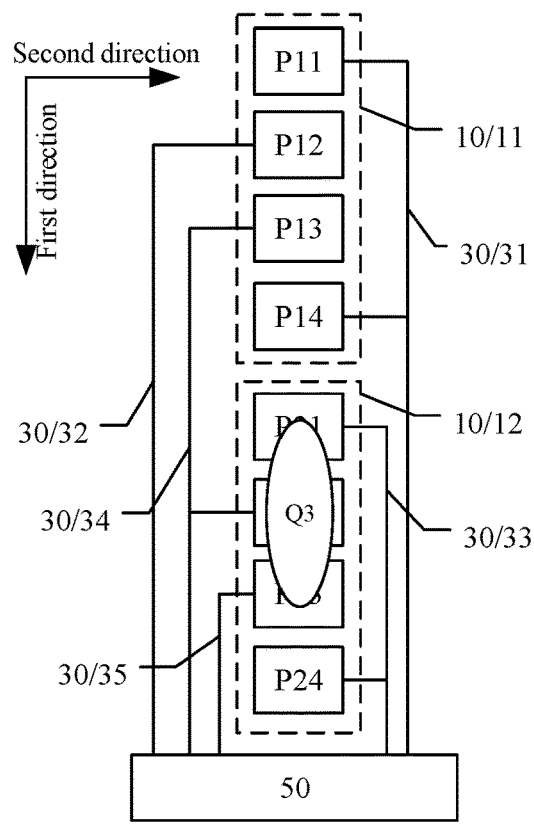
FIG. 9C is another schematic touch diagram illustrating the detection of the first coordinate of the touch operation according to at least one embodiment of the present disclosure.

For example, in a situation where a touch region is large, the touch position of the touch operation is determined by three signal lines. As shown in FIG. 9C, in a situation where the touch operation occurs at a Q3 point, the Q3 point partially overlaps each of the first tail electrode P21, the second tail electrode P22 and the third tail electrode P23, so that capacitances of the first tail electrode P21, the second tail electrode P22 and the third tail electrode P23 are changed, and capacitance signals of the third signal line 33, the fourth signal line 34 and the fifth signal line 35 are changed. The touch chip, for example, determines the first coordinate of the touch position of the touch operation by detecting variations of the capacitance signals of the third signal line 33, the fourth signal line 34 and the fifth signal line 35.

For example, the area of the overlap region between the Q3 point and the first tail electrode P21 is Y31, the area of the overlap region between the Q3 point and the second tail electrode P22 is Y32, and the area of the overlap region between the Q3 point and the third tail electrode P23 is Y33. Y32 is larger than Y31 and larger than Y33, so the variation of the capacitance signal of the fourth signal line 34 is the largest, and it is determined that a center of the Q3 point is located at the second tail electrode P22.

Figure 9D:
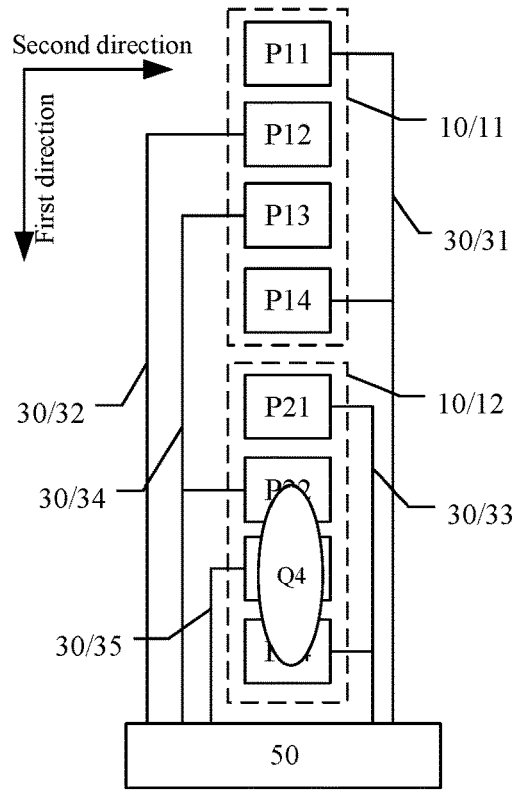
FIG. 9D is still another schematic diagram illustrating the detection of the first coordinate of the touch operation according to at least one embodiment of the present disclosure.

For another example, as shown in FIG. 9D, in a situation where the touch operation occurs at a Q4 point, the Q4 point partially overlaps each of the second tail electrode P22, the third tail electrode P23 and the fourth tail electrode P24, so that capacitances of the second tail electrode P22, the third tail electrode P23 and the fourth tail electrode P24 are changed; because the first tail electrode P21 and the fourth tail electrode P24 are both electrically connected with the third signal line 33, so, as for the Q4 point, it is still that the capacitance signals of the third signal line 33, the fourth signal line 34 and the fifth signal line 35 are changed. The touch chip, for example, determines the first coordinate of the touch position of the touch operation by detecting the variations of the capacitance signals of the third signal line 33, the fourth signal line 34 and the fifth signal line 35.

For example, the area of the overlap region between the Q4 point and the second tail electrode P22 is Y41, the area of the overlap region between the Q4 point and the third tail electrode P23 is Y42, and the area of the overlap region between the Q4 point and the fourth tail electrode P24 is Y43. Y42 is larger than Y41 and larger than Y43, so the variation of the capacitance signal of the fifth signal line 35 is the largest, and it is determined that a center of the Q4 point is located at the third tail electrode P23.

For example, as shown in FIGS. 9C and 9D, both the Q3 point and the Q4 point are determined by detecting the variations of the capacitance signals of the third signal line 33, the fourth signal line 34 and the fifth signal line 35. However, in FIG. 9C, the variation of the capacitance signal of the fourth signal line 34 is the largest; and in FIG. 9D, the variation of the capacitance signal of the fifth signal line 35 is the largest. That is, for the cases shown in FIGS. 9C and 9D, the variations of the capacitance signals of at least a part of the third signal line 33, the fourth signal line 34 and the fifth signal line 35 are different; thereby, the touch chip, for example, determines a center of a touch point according to values of the variations of the capacitance signals of the third signal line 33, the fourth signal line 34 and the fifth signal line 35, so as to determine the accurate position of the touch point.

Figure 10:
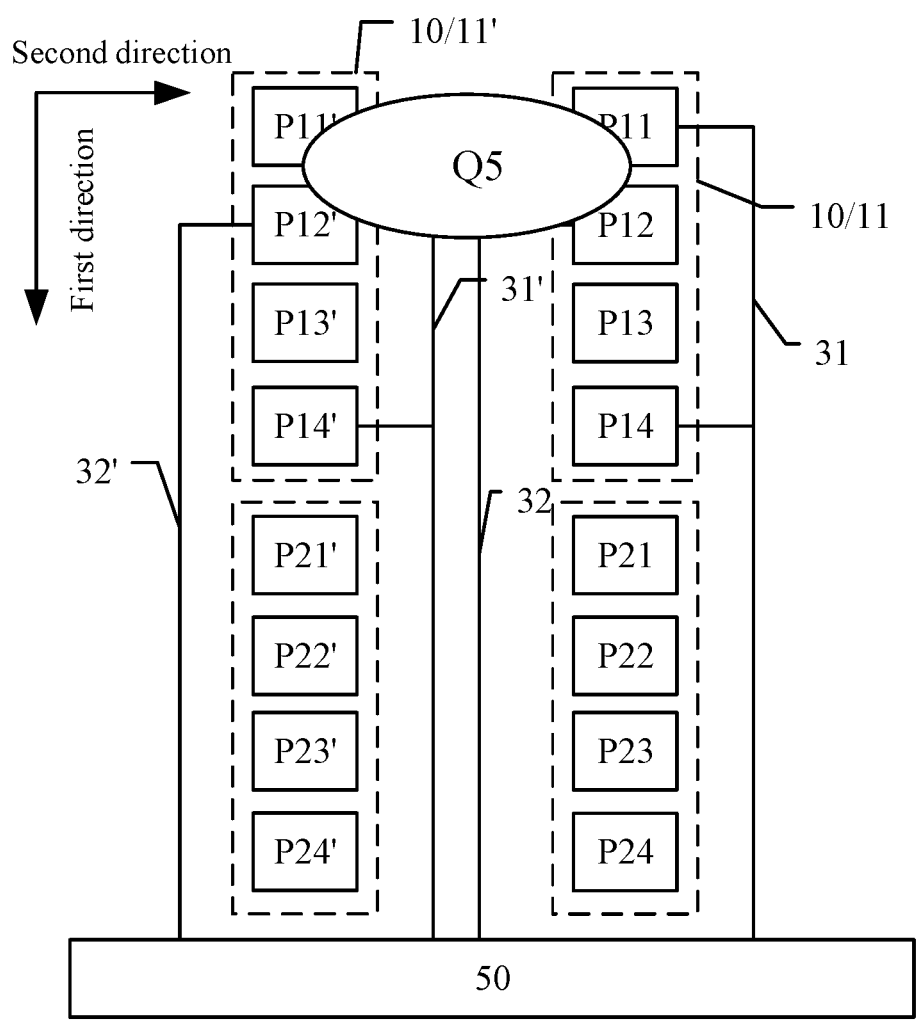
FIG. 10 is a schematic touch diagram illustrating detection of the first coordinate and a second coordinate of the touch operation according to at least one embodiment of the present disclosure.

FIG. 10 is a schematic touch diagram showing detection of the first coordinate and the second coordinate of the touch operation according to at least one embodiment of the present disclosure.

For example, as shown in FIG. 10, in a situation where the touch operation occurs at a Q5 point, the first head electrode P11 and the second head electrode P12 which are in the first head electrode group 11 and the first head electrode P11' and the second head electrode P12' which are in the second head electrode group 11' each partially overlap the Q5 point, so that the first coordinate and the second coordinate of the touch position (i.e., the Q5 point) of the touch operation is determined, for example, based on the variations of the capacitance signals of the first signal line 31 electrically connected with the first head electrode P11, the second signal line 32 electrically connected with the second head electrode P12, the first signal line 31' electrically connected with the first head electrode P11' and the second signal line 32' electrically connected with the second head electrode P12'.

For example, first, in a situation where the touch chip detects that the capacitance signal of the first signal line 31 is changed, it is determined that the capacitance of the first head electrode P11 or the fourth head electrode P14 is changed; then, in a situation where the touch chip detects that the capacitance signal of the second signal line 32 is changed, it is determined that the capacitance of the second head electrode P12 is changed; because the capacitance signal of the fourth signal line 34 is not changed, the capacitance of the third head electrode P13 is not changed; thus, it is determined that the touch point Q5 is located between the first head electrode P11 and the second head electrode P12 in the first direction. Thereby, the touch chip determines the first coordinate of the touch position of the touch operation by detecting the variations of the capacitance signals of the first signal line 31 and the second signal line 32. Then, because the capacitance signals of the first signal line 31 electrically connected with the first head electrode P11 and the first signal line 31' electrically connected with the first head electrode P11' are changed, it is determined that the touch point Q5 is located between the first head electrode P11 and the first head electrode P11' in the second direction. Thereby, the touch chip determines the second coordinate of the touch position of the touch operation by detecting the variations of the capacitance signals of the first signal line 31 and the first signal line 31'. The specific position of the touched point Q5 is determined according to the first coordinate and the second coordinate.

It should be noted that, for the sake of clarity, FIG. 10 only shows four signal lines, that is, the first signal line 31 electrically connected with the first head electrode P11, the second signal line 32 electrically connected with the second head electrode P12, the first signal line 31' electrically connected with the first head electrode P11', and the second signal line 32' electrically connected with the second head electrode P12'.

Figure 11:
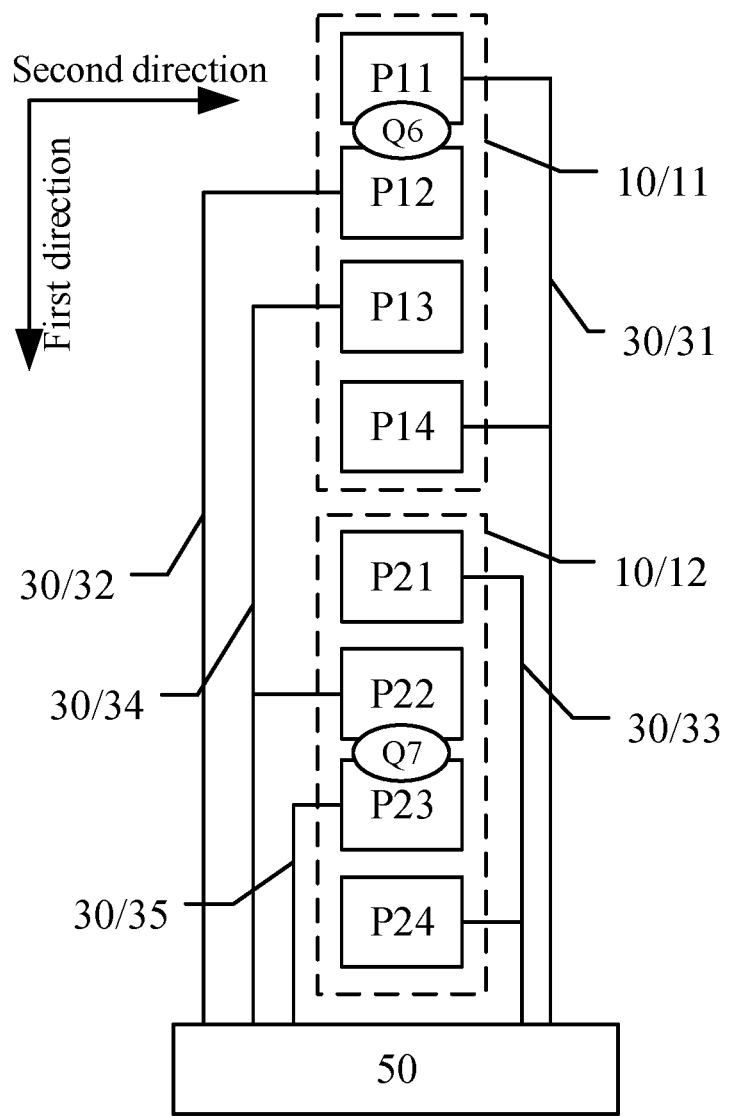
FIG. 11 is a schematic touch diagram illustrating detection of a first coordinate of a multi-touch operation according to at least one embodiment of the present disclosure.

FIG. 11 is a schematic touch diagram showing the detection of the first coordinates of the touch operations of a plurality of touch points.

For example, in the touch operation, firstly, the touch chip determines whether the touch operation is a single touch or a multi-touch according to different signal lines, and then determines the touch position of the touch operation according to the variations of the capacitance signals of the signal lines. In a situation where it is detected that a distance between different electrodes corresponding to the signal lines with changed capacitance signals is greater than or equal to a shortest touch distance, the touch operation is determined to be the multi-touch; in a situation where it is detected that distances between different electrodes corresponding to the signal lines with changed capacitance signals are less than the shortest touch distance, the touch operation is determined to be the single touch. For example, for the multi-touch, the shortest touch distance between two touch points is, for example, 10 mm, and the shortest touch distance is 2.5 times the width of each electrode in the plurality of electrode groups; for example, a maximum width of each electrode in the plurality of electrode groups is 4 mm.

As shown in FIG. 11, in a situation where there are touch operations simultaneously at a Q6 point and a Q7 point, the Q6 point partially overlaps each of the first head electrode P11 and the second head electrode P12, and the Q7 point partially overlaps each of the second tail electrode P22 and the third tail electrode P23, so that the capacitances of the first head electrode P11, the second head electrode P12, the second tail electrode P22 and the third tail electrode P23 are changed, that is, the capacitance signals of the first signal line 31, the second signal line 32, the fourth signal line 34 and the fifth signal line 35 are all changed. Because the capacitance signals of the first signal line 31 and the fifth signal line 35 are both changed, and because a distance between the first head electrode P11 corresponding to the first signal line 31 and the third tail electrode P23 corresponding to the fifth signal line 35 is larger than the shortest touch distance, it is determined that there are two touch points on the touch panel. Then, a position of the Q6 point is determined based on the first signal line 31 and the second signal line 32, and a position of the Q7 point is determined according to the fourth signal line 34 and the fifth signal line 35.

For example, the area of the overlap region between the Q6 point and the first head electrode P11 is same as the area of the overlap region between the Q6 point and the second head electrode P12, so the variations of the capacitance signals of the first signal line 31 and the second signal line 32 are the same, and for example, a normalized variation of the capacitance signals of the first signal line 31 and the second signal line 32 is 0.5. The area of the overlap region between the Q7 point and the first tail electrode P21 is same as the area of the overlap region between the Q7 point and the third tail electrode P23, so the variations of the capacitance signals of the fourth signal line 34 and the fifth signal line 35 are the same, and for example, a normalized variation of the capacitance signals of the fourth signal line 34 and the fifth signal line 35 is 0.5.

It should be noted that, regarding the operation process of detecting the first coordinate and the second coordinate of the touch operation of the plurality of touch points, reference may be made to the detection process of the example shown in FIG. 10 above, and the repeated descriptions are omitted herein.

For the present disclosure, the following points need to be explained.

(1) The drawings of the embodiments of the present disclosure relate only to the structures mentioned in the embodiments of the present disclosure, and other structures can be referred to the general design.

(2) In the case of no conflict, the embodiments of the present disclosure and the features in the embodiments can be combined with each other to obtain a new embodiment.

What are described above is related to the illustrative embodiments of the disclosure only and not limitative to the scope of the disclosure; the scopes of the disclosure are defined by the accompanying claims.

What is claimed is:

1. A touch panel, comprising: a plurality of electrode groups and a plurality of signal lines, wherein
   each of the plurality of signal lines is a single line;
   in a first direction, the plurality of electrode groups are sequentially arranged and the plurality of electrode groups comprise a head electrode group arranged foremost;
   the plurality of signal lines comprise at least a first signal line and a second signal line;
   the head electrode group comprises at least a first head electrode, a second head electrode, a third head electrode and a fourth head electrode, and the second head electrode and the third head electrode are between the first head electrode and the fourth head electrode;
   the first head electrode and the fourth head electrode are electrically and physically connected with the first signal line, and the second signal line is only electrically and physically connected with the second head electrode alone;
   the plurality of electrode groups further comprise a tail electrode group arranged at a rearmost side in the first direction, and the plurality of signal lines further comprise at least a third signal line;
   the tail electrode group comprises at least a first tail electrode, a second tail electrode, a third tail electrode and a fourth tail electrode, the second tail electrode and the third tail electrode are between the first tail electrode and the fourth tail electrode, and the first tail electrode and the fourth tail electrode are electrically and physically connected with the third signal line;
   the plurality of signal lines further comprise a fourth signal line, and the third head electrode and the second tail electrode are electrically and physically connected with the fourth signal line;
   the plurality of signal lines further comprise a fifth signal line, and the fifth signal line is only electrically and physically connected with the third tail electrode alone;
   the head electrode group further comprises a fifth head electrode, the tail electrode group further comprises a fifth tail electrode, and the plurality of signal lines further comprise a seventh signal line;
   the fifth head electrode and the fifth tail electrode are electrically and physically connected with the seventh signal line.

2. The touch panel according to claim 1, wherein the first signal line and the third signal line are on a first side of the head electrode group and the tail electrode group, and the second signal line, the fourth signal line and the fifth signal line are on a second side of the head electrode group and the tail electrode group.

3. The touch panel according to claim 1, wherein the first signal line, the second signal line, the third signal line, the fourth signal line and the fifth signal line are in a same layer.

4. The touch panel according to claim 1, wherein the plurality of electrode groups are in a same layer, and the first signal line, the second signal line and the third signal are in the same layer as the plurality of electrode groups.

5. The touch panel according to claim 1, wherein the fifth head electrode is between the second head electrode and the third head electrode, and the fifth tail electrode is between the second tail electrode and the third tail electrode.

6. The touch panel according to claim 1, wherein the seventh signal line is in a layer different from a layer where at least one of the first signal line, the second signal line and the third signal line is located.

7. The touch panel according to claim 1, wherein in the first direction, the first head electrode, the second head electrode, the third head electrode and the fourth head electrode are sequentially arranged and the first tail electrode, the second tail electrode, the third tail electrode and the fourth tail electrode are sequentially arranged.

8. A touch panel, comprising: a plurality of electrode groups and a plurality of signal lines, wherein each of the plurality of signal lines is a single line;
   in a first direction, the plurality of electrode groups are sequentially arranged and the plurality of electrode groups comprise a head electrode group arranged foremost;
   the plurality of signal lines comprise at least a first signal line and a second signal line;
   the head electrode group comprises at least a first head electrode, a second head electrode, a third head electrode and a fourth head electrode, and the second head electrode and the third head electrode are between the first head electrode and the fourth head electrode;
   the first head electrode and the fourth head electrode are electrically and physically connected with the first signal line, and the second signal line is only electrically and physically connected with the second head electrode alone;
   the plurality of electrode groups further comprise a tail electrode group arranged at a rearmost side in the first direction, and the plurality of signal lines further comprise at least a third signal line;
   the tail electrode group comprises at least a first tail electrode, a second tail electrode, a third tail electrode and a fourth tail electrode, the second tail electrode and the third tail electrode are between the first tail electrode and the fourth tail electrode, and the first tail electrode and the fourth tail electrode are electrically and physically connected with the third signal line;
   the plurality of signal lines further comprise a fourth signal line, and the third head electrode and the second tail electrode are electrically and physically connected with the fourth signal line;
   the tail electrode group further comprises a fifth tail electrode and a sixth tail electrode, and the plurality of signal lines further comprise a fifth signal line and a sixth signal line;
   the first tail electrode, the second tail electrode, the third tail electrode, the fourth tail electrode, the fifth tail electrode and the sixth tail electrode are sequentially arranged in the first direction;
   the sixth signal line is only electrically and physically connected with the fifth tail electrode alone, and the third tail electrode and the sixth tail electrode are electrically and physically connected with the fifth signal line.

9. A touch panel, comprising: a plurality of electrode groups and a plurality of signal lines, wherein each of the plurality of signal lines is a single line;

in a first direction, the plurality of electrode groups are sequentially arranged and the plurality of electrode groups comprise a head electrode group arranged foremost;

the plurality of signal lines comprise at least a first signal line and a second signal line;

the head electrode group comprises at least a first head electrode, a second head electrode, a third head electrode and a fourth head electrode, and the second head electrode and the third head electrode are between the first head electrode and the fourth head electrode;

the first head electrode and the fourth head electrode are electrically and physically connected with the first signal line, and the second signal line is only electrically and physically connected with the second head electrode alone;

the plurality of electrode groups further comprise a tail electrode group arranged at a rearmost side in the first direction, and the plurality of signal lines further comprise at least a third signal line;

the tail electrode group comprises at least a first tail electrode, a second tail electrode, a third tail electrode and a fourth tail electrode, the second tail electrode and the third tail electrode are between the first tail electrode and the fourth tail electrode, and the first tail electrode and the fourth tail electrode are electrically and physically connected with the third signal line;

the plurality of electrode groups further comprise an intermediate electrode group between the head electrode group and the tail electrode group, and the plurality of signal lines further comprise a fourth signal line, an eighth signal line and a ninth signal line;

the intermediate electrode group comprises at least a first intermediate electrode, a second intermediate electrode, a third intermediate electrode and a fourth intermediate electrode;

the first intermediate electrode and the fourth intermediate electrode are electrically and physically connected with the eighth signal line, the third head electrode and the second intermediate electrode are electrically and physically connected with the fourth signal line, and the third intermediate electrode and the second tail electrode are electrically and physically connected with the ninth signal line.

10. The touch panel according to claim 9, wherein the head electrode group further comprises a fifth head electrode, the tail electrode group further comprises a fifth tail electrode, the intermediate electrode group further comprises a fifth intermediate electrode, and the plurality of signal lines further comprise a seventh signal line and a tenth signal line;

the fifth head electrode is between the second head electrode and the third head electrode, the fifth intermediate electrode is between the second intermediate electrode and the third intermediate electrode, and the fifth tail electrode is between the second tail electrode and the third tail electrode;

the fifth head electrode is electrically and physically connected with the seventh signal line, and the fifth tail electrode is electrically and physically connected with the tenth signal line; and the fifth intermediate electrode is electrically and physically connected with the seventh signal line, or the fifth intermediate electrode is electrically and physically connected with the tenth signal line.

* * * * *